US012592853B2

(12) United States Patent
Kahr

(10) Patent No.: US 12,592,853 B2
(45) Date of Patent: Mar. 31, 2026

(54) AUTOMATED DETERMINATION OF ERROR-CAUSING NETWORK PACKETS UTILIZING NETWORK PACKET REPLAY

(71) Applicant: Dell Products L.P., Round Rock, TX (US)

(72) Inventor: Barry J. Kahr, San Antonio, TX (US)

(73) Assignee: Dell Products L.P., Round Rock, TX (US)

( * ) Notice: Subject to any disclaimer, the term of this patent is extended or adjusted under 35 U.S.C. 154(b) by 382 days.

(21) Appl. No.: 18/364,549

(22) Filed: Aug. 3, 2023

(65) Prior Publication Data

US 2025/0047549 A1     Feb. 6, 2025

(51) Int. Cl.
*H04L 41/06*          (2022.01)
*H04L 43/10*          (2022.01)
*H04L 43/50*          (2022.01)

(52) U.S. Cl.
CPC .............. *H04L 41/06* (2013.01); *H04L 43/10* (2013.01); *H04L 43/50* (2013.01)

(58) Field of Classification Search
CPC ....... H04L 41/06; H04L 41/044; H04L 43/10; H04L 43/50; H04L 43/0847; H04L 43/0811
USPC ................................. 370/352, 252
See application file for complete search history.

(56) References Cited

U.S. PATENT DOCUMENTS

| | | | | |
|---|---|---|---|---|
| 9,100,299 | B2 * | 8/2015 | Krzanowski | ........ H04L 43/0811 |
| 10,284,460 | B1 * | 5/2019 | Bshara | .................... H04L 45/26 |
| 10,397,143 | B1 * | 8/2019 | Plenderleith | .......... H04L 49/257 |
| 10,764,214 | B1 * | 9/2020 | Plenderleith | ........ H04L 43/0847 |
| 11,632,326 | B1 * | 4/2023 | Hegar | ..................... H04L 45/28 |
| | | | | 709/238 |
| 2009/0213861 | A1 * | 8/2009 | Benner | ................... H04L 49/90 |
| | | | | 370/400 |
| 2009/0249154 | A1 * | 10/2009 | Sasaki | ................... H04L 1/1829 |
| | | | | 714/E11.131 |
| 2020/0162344 | A1 * | 5/2020 | Zapponi | ................ H04L 41/044 |

OTHER PUBLICATIONS

VMware, "Alarm About High pNIC Error Rate Being Detected," https://kb.vmware.com/s/article/83627#, Nov. 10, 2022, 3 pages.

(Continued)

*Primary Examiner* — Jungwon Chang

(74) *Attorney, Agent, or Firm* — Ryan, Mason & Lewis, LLP

(57)          ABSTRACT

An apparatus comprises at least one processing device configured to obtain a network trace comprising network packets received at a given network adapter of an information technology (IT) asset, to provision a test bed for analyzing the obtained network trace, and to replay the network packets in the obtained network trace from a transmit host of the test bed to a given port of a receive host of the test bed associated with a network adapter having a network adapter configuration corresponding to the given network adapter of the IT asset. The processing device is further configured to parse port statistics of the given port of the receive host, and to determine, based at least in part on the parsed port statistics, whether respective ones of the packets comprise error-causing packets having at least a threshold likelihood of being sources of alarms raised on the IT asset.

20 Claims, 9 Drawing Sheets

(56)             References Cited

OTHER PUBLICATIONS

VMware, "VMware Accessibility Conformance Report, International Edition," May 2021, 36 pages.
R. Sharpe et al., "Wireshark User's Guide," Version 4.1.0, Jul. 2023, 355 pages.
U. Lamping et al., "Wireshark Developer's Guide," Version 4.1.0, Jul. 2023, 324 pages.

* cited by examiner

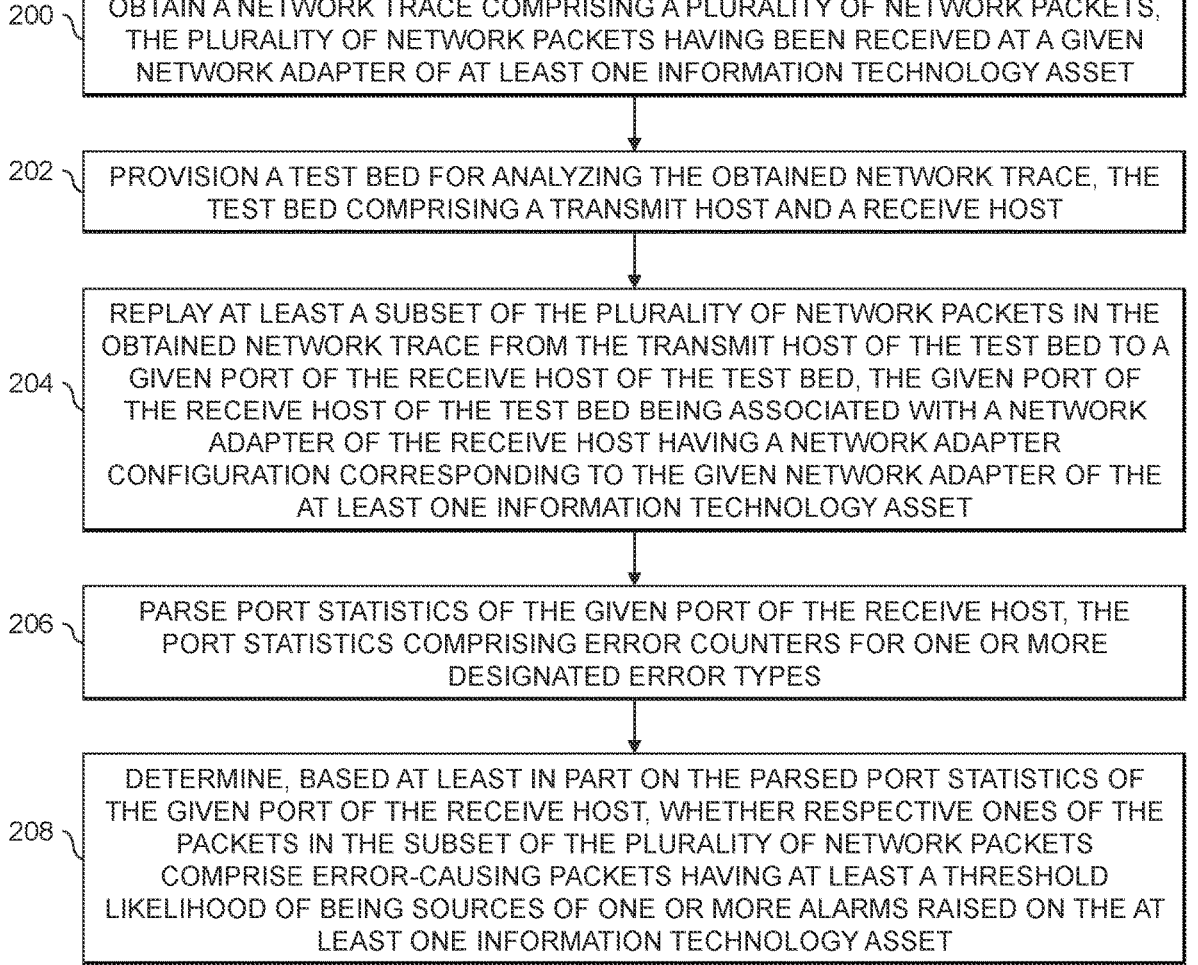

200 — OBTAIN A NETWORK TRACE COMPRISING A PLURALITY OF NETWORK PACKETS, THE PLURALITY OF NETWORK PACKETS HAVING BEEN RECEIVED AT A GIVEN NETWORK ADAPTER OF AT LEAST ONE INFORMATION TECHNOLOGY ASSET

202 — PROVISION A TEST BED FOR ANALYZING THE OBTAINED NETWORK TRACE, THE TEST BED COMPRISING A TRANSMIT HOST AND A RECEIVE HOST

204 — REPLAY AT LEAST A SUBSET OF THE PLURALITY OF NETWORK PACKETS IN THE OBTAINED NETWORK TRACE FROM THE TRANSMIT HOST OF THE TEST BED TO A GIVEN PORT OF THE RECEIVE HOST OF THE TEST BED, THE GIVEN PORT OF THE RECEIVE HOST OF THE TEST BED BEING ASSOCIATED WITH A NETWORK ADAPTER OF THE RECEIVE HOST HAVING A NETWORK ADAPTER CONFIGURATION CORRESPONDING TO THE GIVEN NETWORK ADAPTER OF THE AT LEAST ONE INFORMATION TECHNOLOGY ASSET

206 — PARSE PORT STATISTICS OF THE GIVEN PORT OF THE RECEIVE HOST, THE PORT STATISTICS COMPRISING ERROR COUNTERS FOR ONE OR MORE DESIGNATED ERROR TYPES

208 — DETERMINE, BASED AT LEAST IN PART ON THE PARSED PORT STATISTICS OF THE GIVEN PORT OF THE RECEIVE HOST, WHETHER RESPECTIVE ONES OF THE PACKETS IN THE SUBSET OF THE PLURALITY OF NETWORK PACKETS COMPRISE ERROR-CAUSING PACKETS HAVING AT LEAST A THRESHOLD LIKELIHOOD OF BEING SOURCES OF ONE OR MORE ALARMS RAISED ON THE AT LEAST ONE INFORMATION TECHNOLOGY ASSET

FIG. 2

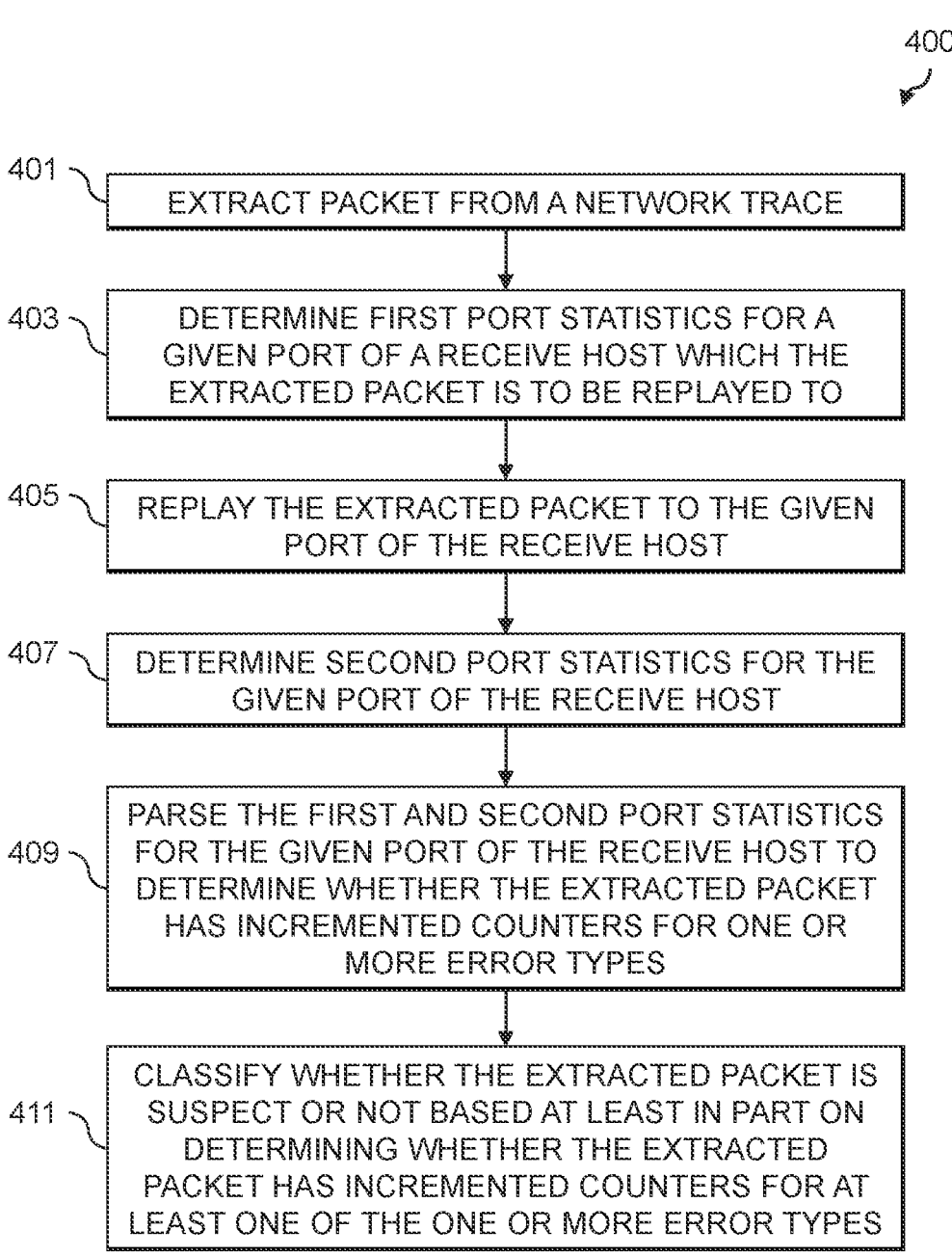

401 — EXTRACT PACKET FROM A NETWORK TRACE

403 — DETERMINE FIRST PORT STATISTICS FOR A GIVEN PORT OF A RECEIVE HOST WHICH THE EXTRACTED PACKET IS TO BE REPLAYED TO

405 — REPLAY THE EXTRACTED PACKET TO THE GIVEN PORT OF THE RECEIVE HOST

407 — DETERMINE SECOND PORT STATISTICS FOR THE GIVEN PORT OF THE RECEIVE HOST

409 — PARSE THE FIRST AND SECOND PORT STATISTICS FOR THE GIVEN PORT OF THE RECEIVE HOST TO DETERMINE WHETHER THE EXTRACTED PACKET HAS INCREMENTED COUNTERS FOR ONE OR MORE ERROR TYPES

411 — CLASSIFY WHETHER THE EXTRACTED PACKET IS SUSPECT OR NOT BASED AT LEAST IN PART ON DETERMINING WHETHER THE EXTRACTED PACKET HAS INCREMENTED COUNTERS FOR AT LEAST ONE OF THE ONE OR MORE ERROR TYPES

AUTOMATED DETERMINATION OF ERROR-CAUSING NETWORK PACKETS UTILIZING NETWORK PACKET REPLAY

BACKGROUND

Support platforms may be utilized to provide various services for sets of managed computing devices. Such services may include, for example, troubleshooting and remediation of issues encountered on computing devices managed by a support platform. This may include periodically collecting information on the state of the managed computing devices, and using such information for troubleshooting and remediation of the issues. Such troubleshooting and remediation may include receiving requests to provide servicing of hardware and software components of computing devices. For example, users of computing devices may submit service requests to a support platform to troubleshoot and remediate issues with hardware and software components of computing devices. Such requests may be for servicing under a warranty or other type of service contract offered by the support platform to users of the computing devices. Support platforms may also provide functionality for testing managed computing devices.

SUMMARY

Illustrative embodiments of the present disclosure provide techniques for automated determination of error-causing network packets utilizing network packet replay.

In one embodiment, an apparatus comprises at least one processing device comprising a processor coupled to a memory. The at least one processing device is configured to obtain a network trace comprising a plurality of network packets, the plurality of network packets having been received at a given network adapter of at least one information technology asset. The at least one processing device is also configured to provision a test bed for analyzing the obtained network trace, the test bed comprising a transmit host and a receive host, and to replay at least a subset of the plurality of network packets in the obtained network trace from the transmit host of the test bed to a given port of the receive host of the test bed, the given port of the receive host of the test bed being associated with a network adapter of the receive host having a network adapter configuration corresponding to the given network adapter of the at least one information technology asset. The at least one processing device is further configured to parse port statistics of the given port of the receive host, the port statistics comprising error counters for one or more designated error types. The at least one processing device is further configured to determine, based at least in part on the parsed port statistics of the given port of the receive host, whether respective ones of the packets in the subset of the plurality of network packets comprise error-causing packets having at least a threshold likelihood of being sources of one or more alarms raised on the at least one information technology asset.

These and other illustrative embodiments include, without limitation, methods, apparatus, networks, systems and processor-readable storage media.

BRIEF DESCRIPTION OF THE DRAWINGS

FIG. 2 is a flow diagram of an exemplary process for automated determination of error-causing network packets utilizing network packet replay in an illustrative embodiment.

FIG. 4 shows a process flow for determining error-causing packets using packet replay between transmit and receive hosts in an illustrative embodiment.

DETAILED DESCRIPTION

Illustrative embodiments will be described herein with reference to exemplary information processing systems and associated computers, servers, storage devices and other processing devices. It is to be appreciated, however, that embodiments are not restricted to use with the particular illustrative system and device configurations shown. Accordingly, the term "information processing system" as used herein is intended to be broadly construed, so as to encompass, for example, processing systems comprising cloud computing and storage systems, as well as other types of processing systems comprising various combinations of physical and virtual processing resources. An information processing system may therefore comprise, for example, at least one data center or other type of cloud-based system that includes one or more clouds hosting tenants that access cloud resources.

Figure 1:
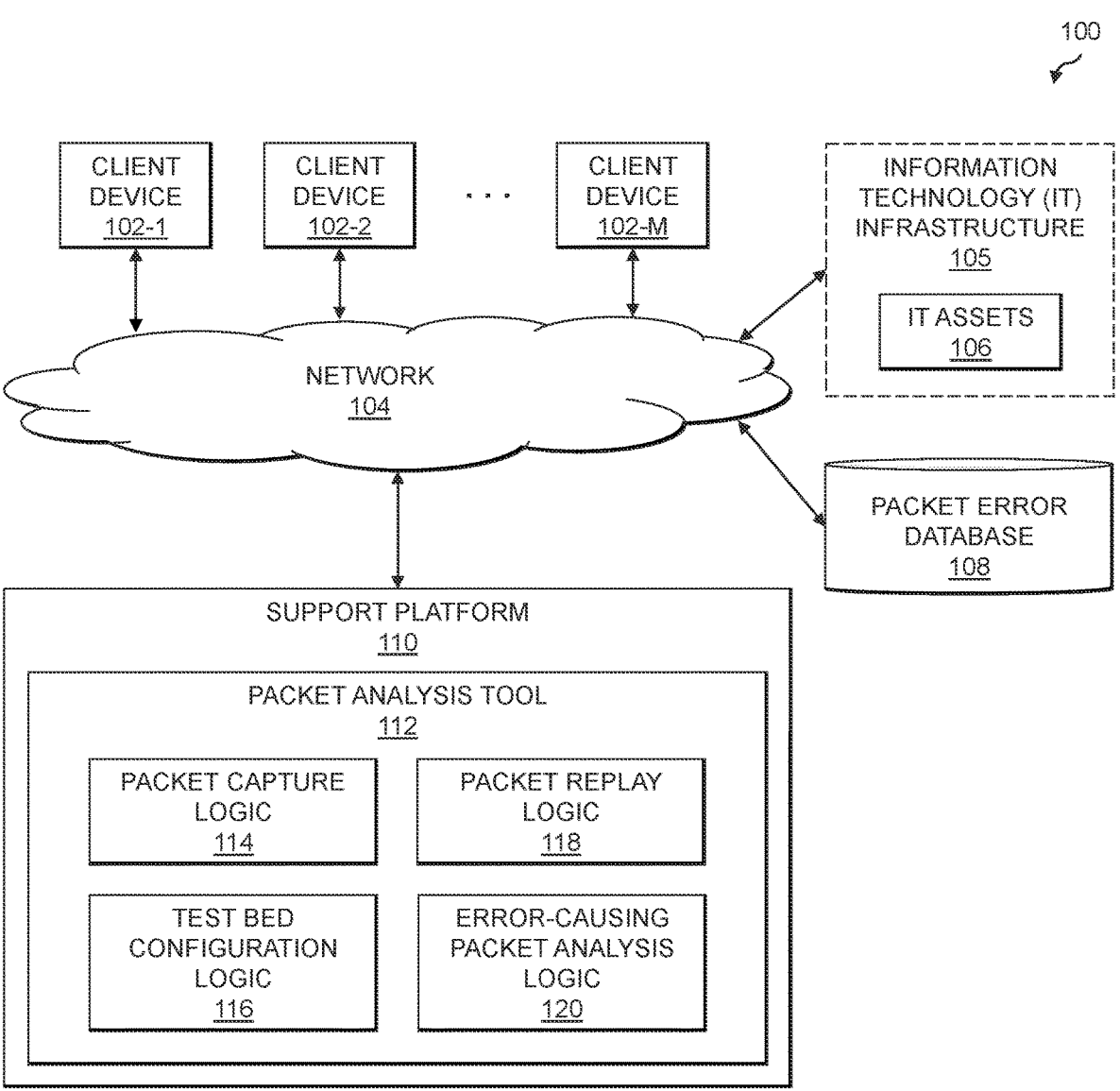
FIG. 1 is a block diagram of an information processing system configured for automated determination of error-causing network packets utilizing network packet replay in an illustrative embodiment.

FIG. 1 shows an information processing system 100 configured in accordance with an illustrative embodiment. The information processing system 100 is assumed to be built on at least one processing platform and provides functionality for automated determination of error-causing network packets utilizing network packet replay. The information processing system 100 includes a set of client devices 102-1, 102-2, . . . 102-M (collectively, client devices 102) which are coupled to a network 104. Also coupled to the network 104 is an information technology (IT) infrastructure 105 comprising one or more IT assets 106, a packet error database 108, and a support platform 110 implementing a packet analysis tool 112. The IT assets 106 may comprise physical and/or virtual computing resources in the IT infrastructure 105. Physical computing resources may include physical hardware such as servers, storage systems, networking equipment, Internet of Things (IoT) devices, other types of processing and computing devices including desktops, laptops, tablets, smartphones, etc. Virtual computing resources may include virtual machines (VMs), containers, etc.

In some embodiments, the support platform 110 is used for an enterprise system. For example, an enterprise may subscribe to or otherwise utilize the support platform 110 for managing IT assets 106 of the IT infrastructure 105 operated by that enterprise. Users of the enterprise (e.g., software developers, test engineers or other employees, customers or users which may be associated with different ones of the client devices 102) may utilize the packet analysis tool 112 of the support platform 110 in order to analyze sets of packets to determine which of the packets are the source of errors (e.g., which packets cause error counts to increment). As used herein, the term "enterprise system" is intended to be construed broadly to include any group of systems or other computing devices. For example, the IT assets 106 of the IT infrastructure 105 may provide a portion of one or more enterprise systems. A given enterprise system may also or alternatively include one or more of the client devices 102. In some embodiments, an enterprise system includes one or more data centers, cloud infrastructure comprising one or more clouds, etc. A given enterprise system, such as cloud infrastructure, may host assets that are associated with multiple enterprises (e.g., two or more different businesses, organizations or other entities).

The client devices 102 may comprise, for example, physical computing devices such as IoT devices, mobile telephones, laptop computers, tablet computers, desktop computers or other types of devices utilized by members of an enterprise, in any combination. Such devices are examples of what are more generally referred to herein as "processing devices." Some of these processing devices are also generally referred to herein as "computers." The client devices 102 may also or alternately comprise virtualized computing resources, such as VMs, containers, etc.

The client devices 102 in some embodiments comprise respective computers associated with a particular company, organization or other enterprise. Thus, the client devices 102 may be considered examples of assets of an enterprise system. In addition, at least portions of the information processing system 100 may also be referred to herein as collectively comprising one or more "enterprises." Numerous other operating scenarios involving a wide variety of different types and arrangements of processing nodes are possible, as will be appreciated by those skilled in the art.

The network 104 is assumed to comprise a global computer network such as the Internet, although other types of networks can be part of the network 104, including a wide area network (WAN), a local area network (LAN), a satellite network, a telephone or cable network, a cellular network, a wireless network such as a WiFi or WiMAX network, or various portions or combinations of these and other types of networks.

The packet error database 108 is configured to store and record various information that is utilized by the packet analysis tool 112. Such information may include, for example, sets of packets to be analyzed, the results of packet analysis, error information and counts associated with different sources of packets to be analyzed, etc. In some embodiments, one or more storage systems utilized to implement the packet error database 108 comprise a scale-out all-flash content addressable storage array or other type of storage array. Various other types of storage systems may be used, and the term "storage system" as used herein is intended to be broadly construed, and should not be viewed as being limited to content addressable storage systems or flash-based storage systems. A given storage system as the term is broadly used herein can comprise, for example, network-attached storage (NAS), storage area networks (SANs), direct-attached storage (DAS) and distributed DAS, as well as combinations of these and other storage types, including software-defined storage.

Other particular types of storage products that can be used in implementing storage systems in illustrative embodiments include all-flash and hybrid flash storage arrays, software-defined storage products, cloud storage products, object-based storage products, and scale-out NAS clusters. Combinations of multiple ones of these and other storage products can also be used in implementing a given storage system in an illustrative embodiment.

Although not explicitly shown in FIG. 1, one or more input-output devices such as keyboards, displays or other types of input-output devices may be used to support one or more user interfaces to the support platform 110 and/or the packet analysis tool 112, as well as to support communication between the support platform 110, the packet analysis tool 112 and other related systems and devices not explicitly shown.

The support platform 110 and/or the packet analysis tool 112 may be provided as a cloud service that is accessible by one or more of the client devices 102 to allow users thereof to manage the IT assets 106 of the IT infrastructure 105. The client devices 102 may be configured to access or otherwise utilize the support platform 110 and/or the packet analysis tool 112 to analyze sets of packets of one or more of the IT assets 106 to determine which of such packets are error-causing packets. In some embodiments, the client devices 102 are assumed to be associated with system administrators, IT managers or other authorized personnel responsible for managing the IT assets 106. In some embodiments, the IT assets 106 of the IT infrastructure 105 are owned or operated by the same enterprise that operates the support platform 110. In other embodiments, the IT assets 106 of the IT infrastructure 105 may be owned or operated by one or more enterprises different than the enterprise which operates the support platform 110 (e.g., a first enterprise provides support for multiple different customers, business, etc.). Various other examples are possible.

In some embodiments, the client devices 102 and/or the IT assets 106 of the IT infrastructure 105 may implement host agents that are configured for automated transmission of information with the support platform 110 and/or the packet analysis tool 112 regarding packet error analysis for sets of packets associated with one or more of the IT assets 106 of the IT infrastructure 105. It should be noted that a "host agent" as this term is generally used herein may comprise an automated entity, such as a software entity running on a processing device. Accordingly, a host agent need not be a human entity.

The support platform 110 in the FIG. 1 embodiment is assumed to be implemented using at least one processing device. Each such processing device generally comprises at least one processor and an associated memory, and implements one or more functional modules or logic for controlling certain features of the support platform 110. In the FIG. 1 embodiment, the support platform 110 implements the packet analysis tool 112, which includes packet capture logic 114, test bed configuration logic 116, packet replay logic 118, and error-causing packet analysis logic 120. The packet capture logic 114 implements a front-end interface (e.g., a graphical user interface) of the packet analysis tool 112 which allows client devices 102 to submit network traces (e.g., packet capture files, such as .pcap files) for analysis. The network traces may be collected from one or more of the IT assets 106 of the IT infrastructure 105.

The test bed configuration logic 116 is configured to provision and configure a back-end test bed for analyzing packets in the network traces submitted by the client devices 102. Provisioning and configuring the back-end test bed may include instantiating and setting up a transmit host and a receive host, each of which may comprise a physical server, a virtualized server, combinations thereof, etc. More particularly, such provisioning and configuration includes determining, for a given network trace to be analyzed, a given network adapter hardware configuration used in the environment from which packets in the given network trace were captured (e.g., the network adapter hardware configurations of ones of the IT assets 106 of the IT infrastructure 105 which are sources of the network traces). The back-end test bed is then configured such that the transmit host directs packets to be replayed to a given port (or ports) of the receive host which has the given network adapter hardware configuration.

The packet replay logic 118 is configured to replay packets from the given network trace between the transmit host and the given port of the receive host. The error-causing packet analysis logic 120 is configured to analyze port statistics of the given port of the receive host before and after one or more of the packets have been replayed. In some embodiments, the port statistics for the given port are determined before and after each packet is replayed, to determine whether error counters for one or more designated error types have been incremented. The error-causing packet analysis logic 120 can then generate a report enabling users of the client devices 102 to view "suspect" or potentially error-causing ones of the packets in submitted network traces. The error-causing packet analysis logic 120 can further take various automated actions in response to detecting suspect or potentially error-causing ones of the packets in the submitted network traces. Such automated actions may include, for example, inspecting contents of the suspect packets, determining whether suspect packets are benign (such that associated errors or alarms raised by such benign suspect packets may be ignored), responsive to determining that one or more suspect packets are not benign, modifying configurations of end-user environments (e.g., IT assets 106 of the IT infrastructure 105) to prevent similar future packets from raising errors or alarms, etc.

At least portions of the packet analysis tool 112, the packet capture logic 114, the test bed configuration logic 116, the packet replay logic 118, and the error-causing packet analysis logic 120 may be implemented at least in part in the form of software that is stored in memory and executed by a processor.

It is to be appreciated that the particular arrangement of the client devices 102, the IT infrastructure 105, the packet error database 108 and the support platform 110 illustrated in the FIG. 1 embodiment is presented by way of example only, and alternative arrangements can be used in other embodiments. As discussed above, for example, the support platform 110 (or portions of components thereof, such as one or more of the packet analysis tool 112, the packet capture logic 114, the test bed configuration logic 116, the packet replay logic 118, and the error-causing packet analysis logic 120) may in some embodiments be implemented internal to one or more of the client devices 102 and/or the IT infrastructure 105.

The support platform 110 and other portions of the information processing system 100, as will be described in further detail below, may be part of cloud infrastructure.

The support platform 110 and other components of the information processing system 100 in the FIG. 1 embodiment are assumed to be implemented using at least one processing platform comprising one or more processing devices each having a processor coupled to a memory. Such processing devices can illustratively include particular arrangements of compute, storage and network resources.

The client devices 102, IT infrastructure 105, the packet error database 108 and the support platform 110 or components thereof (e.g., the packet analysis tool 112, the packet capture logic 114, the test bed configuration logic 116, the packet replay logic 118, and the error-causing packet analysis logic 120) may be implemented on respective distinct processing platforms, although numerous other arrangements are possible. For example, in some embodiments at least portions of the support platform 110 and one or more of the client devices 102, the IT infrastructure 105 and/or the packet error database 108 are implemented on the same processing platform. A given client device (e.g., 102-1) can therefore be implemented at least in part within at least one processing platform that implements at least a portion of the support platform 110.

The term "processing platform" as used herein is intended to be broadly construed so as to encompass, by way of illustration and without limitation, multiple sets of processing devices and associated storage systems that are configured to communicate over one or more networks. For example, distributed implementations of the information processing system 100 are possible, in which certain components of the system reside in one data center in a first geographic location while other components of the system reside in one or more other data centers in one or more other geographic locations that are potentially remote from the first geographic location. Thus, it is possible in some implementations of the information processing system 100 for the client devices 102, the IT infrastructure 105, IT assets 106, the packet error database 108 and the support platform 110, or portions or components thereof, to reside in different data centers. Numerous other distributed implementations are possible. The support platform 110 can also be implemented in a distributed manner across multiple data centers.

Additional examples of processing platforms utilized to implement the support platform 110 and other components of the information processing system 100 in illustrative embodiments will be described in more detail below in conjunction with FIGS. 5 and 6.

It is to be understood that the particular set of elements shown in FIG. 1 for automated determination of error-causing network packets utilizing network packet replay is presented by way of illustrative example only, and in other embodiments additional or alternative elements may be used. Thus, another embodiment may include additional or alternative systems, devices and other network entities, as well as different arrangements of modules and other components.

It is to be appreciated that these and other features of illustrative embodiments are presented by way of example only, and should not be construed as limiting in any way.

An exemplary process for automated determination of error-causing network packets utilizing network packet replay will now be described in more detail with reference to the flow diagram of FIG. 2. It is to be understood that this particular process is only an example, and that additional or alternative processes for automated determination of error-causing network packets utilizing network packet replay may be used in other embodiments.

In this embodiment, the process includes steps 200 through 208. These steps are assumed to be performed by the support platform 110 utilizing the packet analysis tool 112, the packet capture logic 114, the test bed configuration logic 116, the packet replay logic 118, and the error-causing packet analysis logic 120. The process begins with step 200, obtaining a network trace comprising a plurality of network packets, the plurality of network packets having been received at a given network adapter of at least one IT asset. In step 202, a test bed is provisioned for analyzing the obtained network trace. The test bed comprises a transmit host and a receive host. In step 204, at least a subset of the plurality of network packets in the obtained network trace are replayed from the transmit host of the test bed to a given port of the receive host of the test bed. The given port of the receive host of the test bed is associated with a network adapter of the receive host having a network adapter configuration corresponding to the given network adapter of the at least one IT asset. Port statistics of the given port of the receive host are parsed in step 206. The port statistics comprise error counters for one or more designated error types. In step 208, a determination is made, based at least in part on the parsed port statistics of the given port of the receive host, as to whether respective ones of the packets in the subset of the plurality of network packets comprise error-causing packets having at least a threshold likelihood of being sources of one or more alarms raised on the at least one IT asset.

In some embodiments, the at least one IT asset comprises hyper-converged infrastructure utilizing storage virtualization software to implement one or more virtual storage networks and the given network adapter comprises a physical network interface card used for processing storage traffic in the one or more virtual storage networks. The one or more alarms raised on the at least one IT asset may comprise alarms raised in the storage virtualization software in response to counters of the one or more designated error types for the given network adapter exceeding respective designated error count thresholds.

The receive host of the test bed may comprise a server with two or more network adapters having two or more different network adapter configurations. Replaying at least a subset of the plurality of network packets in the obtained network trace from the transmit host of the test bed to the given port of the receive host of the test bed may comprise selecting the given port associated with one of the two or more network adapters of the server which matches the given network adapter of the at least one IT asset. The server may comprise a physical server and the two or more network adapters comprise two or more physical network interface cards. The server may alternatively comprise a virtual server and the two or more network adapters comprise two or more virtual network interface cards. The server may run a bare metal hypervisor with one or more VMs configured to run an operating system (OS) matching that of the at least one IT asset.

The receive host of the test bed may comprise a server with a network adapter configured to emulate two or more different network adapter configurations. Replaying at least a subset of the plurality of network packets in the obtained network trace from the transmit host of the test bed to the given port of the receive host of the test bed may comprise configuring the network adapter of the server to emulate the network adapter configuration of the given network adapter of the at least one IT asset.

Parsing the port statistics of the given port of the receive host may comprise comparing first port statistics information of the given port prior to replay of each packet of the subset of the plurality of network packets in the obtained network trace with second port statistics information of the given port subsequent to replay of each packet of the subset of the plurality of network packets in the obtained network trace.

The one or more designated error types may comprise at least one of receive length errors, redundancy check errors, and packet drop errors.

The network trace may comprise a packet capture file with a plurality of frames corresponding to the plurality of network packets. Determining whether respective ones of the packets in the subset of the plurality of network packets comprise error-causing packets may comprise: identifying frame identifiers for a subset of the plurality of frames corresponding to the error-causing packets; and generating a filter data structure for filtering the packet capture file to generate another packet capture file including only the subset of the plurality of frames corresponding to the error-causing packets.

The FIG. 2 process may further comprise determining whether a given one of the error-causing packets is benign based at least in part on inspecting contents of the given error-causing packet, which of the one or more error counters the given error-causing packet increments, combinations thereof, etc. Responsive to determining that a given one of the error-causing packets is not benign, the FIG. 2 process may comprise modifying handling of the given error-causing packet by the at least one IT asset.

In various cases, a customer or end user may operate one or more IT assets which can raise alarms or errors which must be analyzed. For example, enterprise storage virtualization software supporting hyper-converged infrastructure (e.g., VMware vSAN) may implement alarms which monitor counters of physical network interface cards (pNICs) which are used for storage traffic in the enterprise storage virtualization software (e.g., VMware vSAN traffic). VMware, for example, has recently introduced a new alarm (e.g., for VMware vSAN 7.0 update 2 or higher) which monitors counters of pNICs used for vSAN traffic, which results in such alarms being reported to technical support (e.g., a support platform such as support platform 110). This alarm, named "High pNIC error rate detected. Check the host's vSAN performance view for details" monitors certain counters or metrics, including: receive (Rx) Cyclic Redundancy Check (CRC) errors; transmit (Tx) Carrier errors; Rx errors; Tx errors; Rx/Tx Pause; Rx Missed errors; Rx Over errors; Rx FIFO errors (e.g., a number of times an overflow occurs in a ring buffer); etc. These and other "pNIC" alarms may drive escalations and related work for customers or other end users, as well as operators of support platforms, technology partner teams, etc.

Typically, pNIC alarm counters do not indicate a problem with the hardware pNIC devices, and instead the counts are incremented based on various networking standards and specifications that dictate how error packets are processed and reported. Changing either the reporting or processing behavior may be a violation of these guiding standards. Illustrative embodiments provide technical solutions which are able to automatically identify error-causing packets (e.g., suspect packets that drive pNIC alarms) in networks. The technical solutions can save considerable time and manual effort which would otherwise be required for manual packet error analysis.

In some embodiments, the technical solutions include a front-end interface (e.g., a web interface, such as a web-based graphical user interface (GUI)), a database, and a back-end test bed. The front-end interface allows for an end-user to provide network traces (e.g., a set of packets) collected at the end-user environment, where the network traces exhibit alarms or errors (e.g., pNIC alarms or errors) that the end-user would like to analyze. The end-user can also utilize the front-end interface to specify the network interface card (NIC) hardware configuration used in the end-user environment. In some embodiments, the NIC hardware configuration used in the end-user environment may be determined automatically without requiring the end-user to manually input or provide such information to the front-end interface. The database is used to track end-users and their associated packet analysis jobs, including job status, results, optional payments, etc. The back-end test bed may include a hardware test bed, which includes server hardware with at least two network ports connected (e.g., directly, or via one or more switches). The back-end test bed, for example, may include a first server acting as a transmitter or a transmit host and a second server acting as a receiver or a receive host. Each of the first and second servers in the back-end test bed may be implemented as a physical server or a virtual server. In some embodiments, the first server (e.g., the transmitter or transmit host) comprises a physical server or VM, while the second server (e.g., the receiver or receive host) comprises a physical server running a bare metal hypervisor host (e.g., an ESXi host).

Packet capture files (e.g., collected network traces) are passed from the front-end interface or the database to the first server in the back-end test bed. The first server replays end-user network packets to a port of the second server in the back-end test bed which has (or which is configured to emulate) a same network adapter hardware configuration that the end-user is using in their environment. The second server, for example, may include multiple ports associated with different network adapter hardware configurations (e.g., ports of different physical NICs with such different network adapter hardware configurations, ports which are mapped to different virtual NICs configured to emulate physical NICs with different network adapter hardware configurations, combinations thereof, etc.). Network packets for a first end-user that utilizes a first network adapter hardware configuration are sent from the first server to a first one of the ports of the second server associated with the first network adapter hardware configuration, while network packets for a second end-user that utilizes a second network adapter hardware configuration are sent from the first server to a second one of the ports of the second server associated with the second network adapter hardware configuration, etc.

Figure 3A:
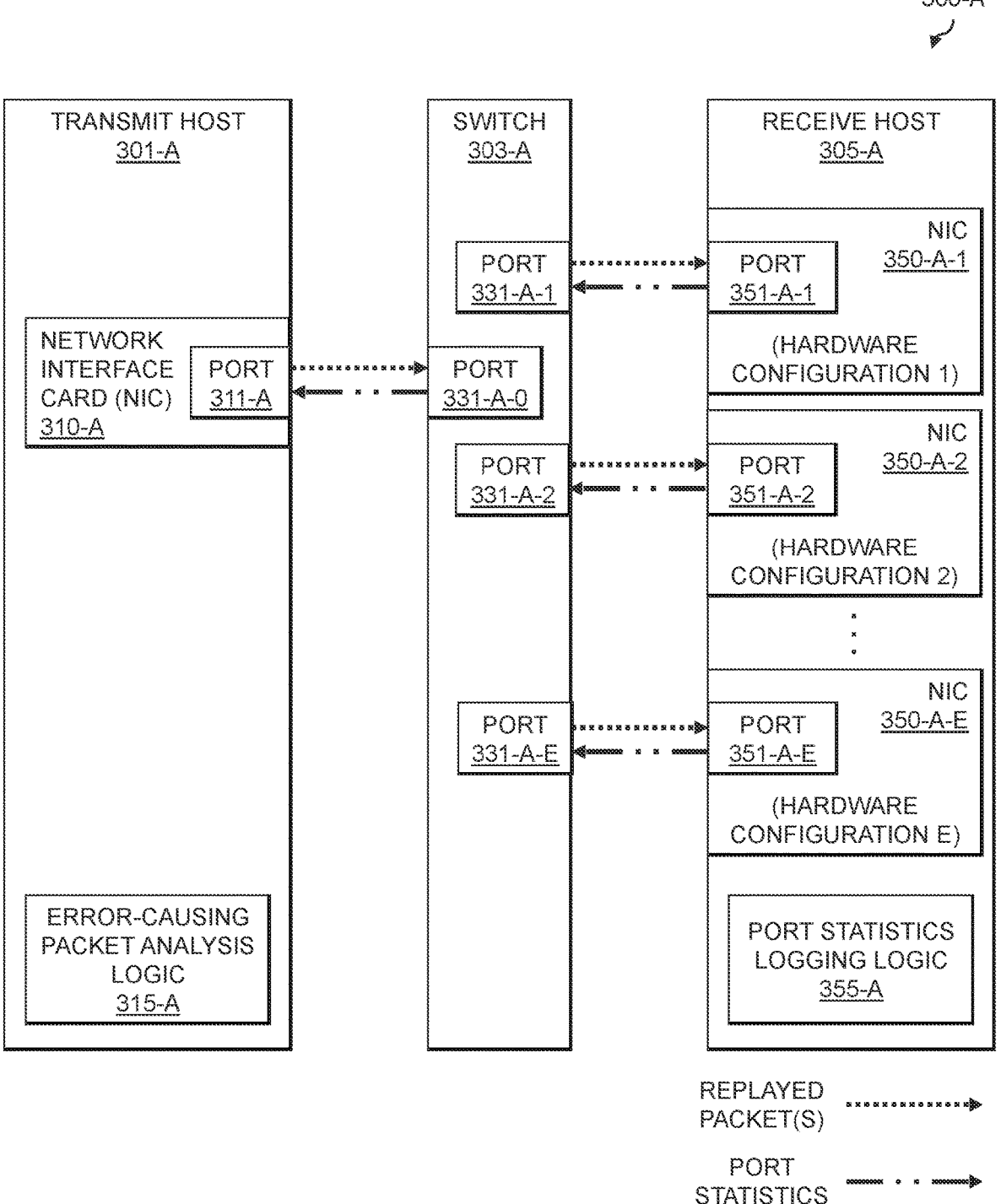
FIGS. 3A-3D show backend test bed configurations configured for determining error-causing packets using packet replay between transmit and receive hosts in illustrative embodiments.

FIGS. 3A-3D show respective system configurations for back-end test beds which may be used in some embodiments. FIG. 3A shows a system configuration 300-A including a transmit host 301-A connected to a receive host 305-A via a switch 303-A. Each of the transmit host 301-A, the receive host 305-A and the switch 303-A may be physical computing resources or virtualized computing resources. The transmit host 301-A comprises a NIC 310-A having a port 311-A, which is connected via a cable (not shown) to a port 331-A-0 of the switch 303-A. The receive host 305-A includes a set of NICs 350-A-1, 350-A-2, . . . 350-A-E (collectively, NICs 350-A) with different hardware configurations. Each of the NICs 350-A includes at least one port 351-A-1, 351-A-2, . . . 351-A-E (collectively, ports 351-A) which are connected via cables (not shown) to ports 331-A-1, 331-A-2, . . . 331-A-E of the switch 303-A. The ports 331-A-0, 331-A-1, 331-A-2, . . . 331-A-E of the switch 303-A are collectively referred to as ports 331-A. The transmit host 301-A is configured to replay end-user packets from the NIC 310-A to particular ones of the NICs 350-A of the receive host 305-A which have hardware configurations that match that of the hardware configurations used by different end-users. The receive host 305-A implements port statistics logging logic 355-A, which is configured to log the port statistics of the different ports 351-A before and after replay of the end-user packets. The transmit host 301-A implements error-causing packet analysis logic 315-A which is configured to obtain port statistics from the ports 351-A (e.g., which are logged via the port statistics logging logic 355) and to analyze such port statistics in order to determine which of the end-user packets are the cause of errors (e.g., which of the end-user packets cause pNIC error counters or alarms to increment).

Figure 3B:
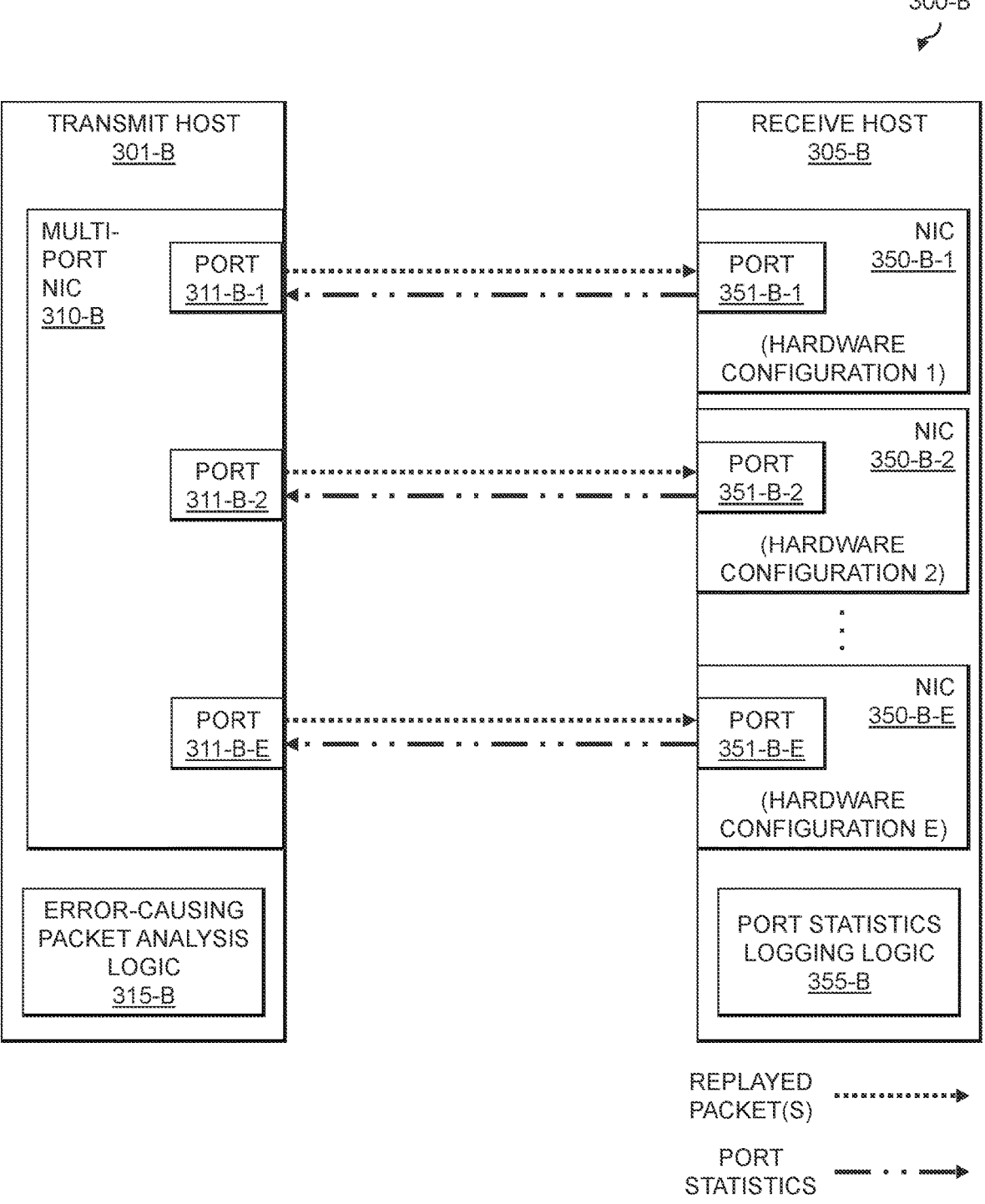

FIG. 3B shows a system configuration 300-B including a transmit host 301-B connected to a receive host 305-B without requiring use of a switch, though it should be noted that one or more switches may be interconnected between the transmit host 301-B and the receive host 305-B if desired. Here, the transmit host 301-B comprises a multi-port NIC 310-B including a set of ports 311-B-1, 311-B-2, . . . 311-B-E (collectively, ports 311-B) which are connected to respective ports 351-B-1, 351-B-2, . . . 351-B-E (collectively, ports 351-B) of NICs 350-B-1, 350-B-2, . . . 350-B-E (collectively, NICs 350-B) of the receive host 305-B. The NICs 350-B of the receive host 305-B are assumed to have different hardware configurations, such that the transmit host 301-B is configured to replay end-user packets from the multi-port NIC 310-B to particular ones of the NICs 350-B which have hardware configurations that match that of the hardware configurations used by different end-users. The transmit host 301-B and the receive host 305-B are configured to implement error-causing packet analysis logic 315-B and port statistics logging logic 355-B, which are configured to provide functionality similar to that described above with respect to the error-causing packet analysis logic 315-A and the port statistics logging logic 355-A.

Figure 3C:
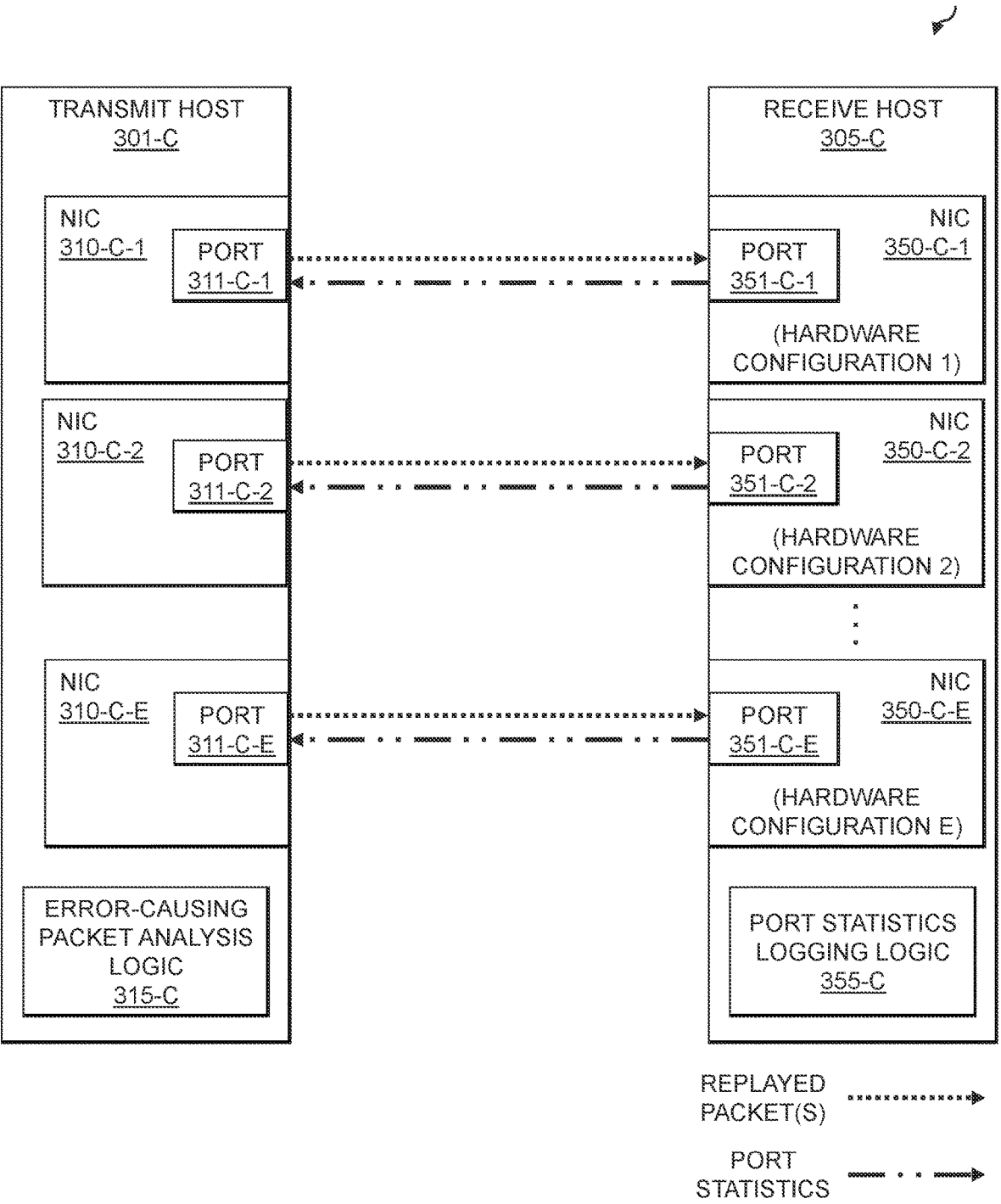

FIG. 3C shows a system configuration 300-C including a transmit host 301-C connected to a receive host 305-C without requiring use of a switch, though it should be noted that one or more switches may be interconnected between the transmit host 301-C and the receive host 305-C if desired. Here, the transmit host 301-C comprises multiple NICs 310-C-1, 310-C-2, . . . 310-C-E (collectively, NICs 310-C) with ports 311-C-1, 311-C-2, . . . 311-C-E (collectively, ports 311) which are connected to respective ports 351-C-1, 351-C-2, . . . 351-C-E (collectively, ports 351-C) of NICs 350-C-1, 350-C-2, . . . 350-C-E (collectively, NICs 350-C) of the receive host 305-C.

The NICs 350-C of the receive host 305-C are assumed to have different hardware configurations, such that the transmit host 301-C is configured to replay end-user packets from different ones of the NICs 310 to particular ones of the NICs 350-C which have hardware configurations that match that of the hardware configurations used by different end-users. The transmit host 301-C and the receive host 305-C are configured to implement error-causing packet analysis logic 315-C and port statistics logging logic 355-C, which are configured to provide functionality similar to that described above with respect to the error-causing packet analysis logic 315-A and the port statistics logging logic 355-A.

Figure 3D:
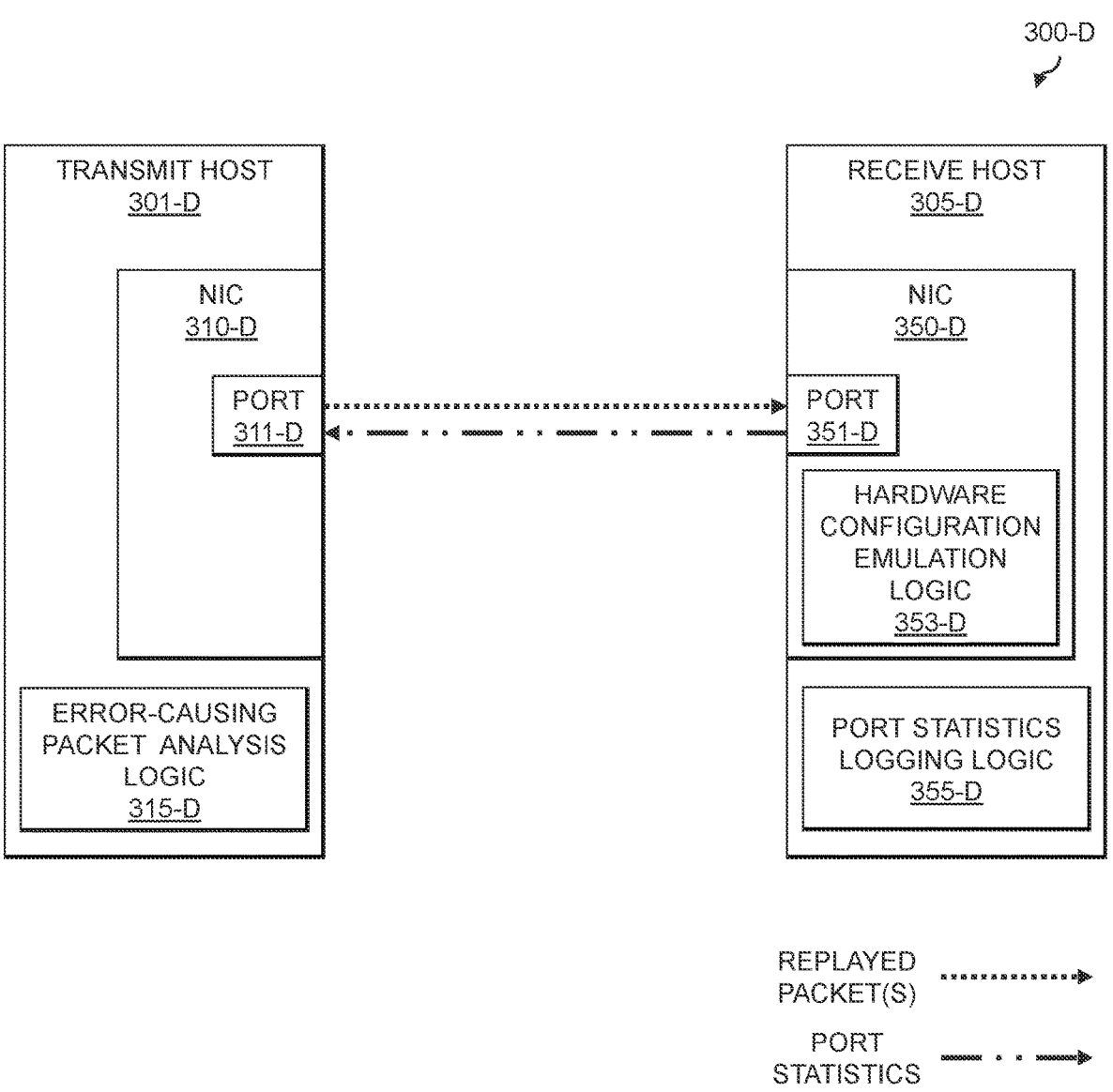

FIG. 3D shows a system configuration 300-D including a transmit host 301-D connected to a receive host 305-D without requiring use of a switch, though it should be noted that one or more switches may be interconnected between the transmit host 301-D and the receive host 305-D if desired. Here, the transmit host 301-D comprises a NIC 310-D with a port 311-D that is connected to a port 351-D of a NIC 350-D of the receive host 305-D. The NIC 350-D of the receive host 305-D implements hardware configuration emulation logic 353-D, which is configured to enable the NIC 350-D to emulate different physical NIC hardware configurations, such that the transmit host 301-D is configured to replay end-user packets from the NIC 310-D to the NIC 350-D which emulates the particular hardware configuration that matches that used by a given end-user. The transmit host 301-D and the receive host 305-D are configured to implement error-causing packet analysis logic 315-D and port statistics logging logic 355-D, which are configured to provide functionality similar to that described above with respect to the error-causing packet analysis logic 315-A and the port statistics logging logic 355-A.

In the description below, the different instances of the transmit hosts 301-A, 301-B, 301-C and 301-D are referred to as transmit host 301, the different instances of the receive host 305-A. 305-B, 305-C and 305-D are referred to as receive host 305, the different instance of the port statistics logging logic 355-A, 355-B, 355-C and 355-D are referred to as port statistics logging logic 355, and the different instances of the error-causing packet analysis logic 315-A, 315-B, 315-C and 315-D are referred to as error-causing packet analysis logic 315.

The port statistics logging logic 355 and error-causing packet analysis logic 315 are configured to monitor operating system (OS) counters related to pNIC errors after each replayed packet arrives at the receive host 305. If a pNIC error is triggered for a given packet, the packet number for the given packet is logged to the database for the end-user's specific job number. Optionally, the port statistics logging logic 355 and the error-causing packet analysis logic 315 can be used to parse the seed packet capture for the actual packet details. When the end user's job completes, the end-user can view a report via the front-end interface of which packets in the collected network traces caused error counters to increment. Based on the report, the customer or other end-user can decide if any remedial actions should be taken for the error-causing packets, or if the error-causing packets may be treated as benign. In some embodiments, remedial actions for different ones of the error-causing packets may be automated.

An example implementation of the back-end test bed operation will now be described, where logic or software runs primarily on the transmit host 301 of the back-end test bed implemented as a Linux host transmitter. In this example implementation, no scripting is needed on the receive host 305 of the back-end test bed, as secure shell protocol (SSH) is used on the transmit host 301 to pull port statistics from the receive host 305. The transmit host 301 uses a packet capture file (e.g., a .pcap file) that has been modified (e.g., using a "tcprewrite" utility) to replace both source and destination media access control (MAC) addresses of packets in the packet capture file with addresses of the ports being used in the back-end test bed (e.g., a first port on the transmit host 301 and a second port on the receive host 305). In some embodiments, the packet capture file does not need to be modified, and logic or software running on the transmit host 301 can automatically replace the source and destination MAC addresses of packets in the packet capture file on-the-fly as the packets are being replayed. The logic or software on the transmit host 301 can then proceed with processing each frame (e.g., each packet) of the input packet capture file one at a time using the process flow 400 shown in FIG. 4.

The process flow 400 begins in step 401 with extracting a packet from a network trace. This may include, for example, extracting a single frame from an input packet capture file (e.g., a pcap file) into a single-frame pcap file (e.g., using the "editcap" utility). In step 403, first port statistics are collected for a given port on the receive host 305 to which the extracted packet is to be replayed to. This may include, for example, utilizing SSH to collect "before" statistics for the given port (e.g., a receiving ESXi host's vmnic which matches the network adapter hardware configuration used by the source of the input pcap file). In step 405, the extracted packet is replayed to the given port on the receive host 305. Second (e.g., updated) port statistics for the given port on the receive host are determined in step 407. Similar to step 403, this may include utilizing SSH to collect "after" statistics for the given port on the receive host 305.

In step 409, the first and second port statistics for the given port are parsed to determine whether the extracted packet has incremented counters for one or more error types. Step 409 may include, for example, parsing the first ("before") and second ("after") port statistics for each of the one or more types of error information (e.g., receive length errors, drops, CRC or redundancy check errors, etc.) to determine whether the value of that counter has changed following replay of the extracted packet. The extracted packet is then classified in step 411 as suspect or not based at least in part on determining whether the extracted packet has incremented counters for at least one of the one or more error types. The frame number in the input pcap file is then saved in an output report file.

After all packets are replayed and checked, the output report file may be displayed, via the front-end interface, to show all the suspect packets that generated each type of error during the test. The output report file may also or alternatively be used for further analysis to determine what the suspect packets are (e.g., their content/purpose), if the suspect packets are critical to operations, if any remedial actions should be taken to address the errors raised by the suspect packets, etc. In some embodiments, the frame numbers in the output report file may be used to extract, from the input packet capture file, just the suspect packets (e.g., using a Wireshark or other type of filter).

It should be noted while the process is described above with respect to packet capture files in the pcap file format, this is not a requirement. End-user packet capture may be in various other formats, including but not limited to a ".pcapng" file format. If desired, such other formats may either be converted into the pcap file format (e.g., using Wireshark or another utility) or the logic may be adjusted to use such other packet capture file formats directly. Hardware configuration files may be used to allow customizations for working with the particular lab hardware of back-end test bed configuration. In some embodiments, the logic is implemented as a script file which, when initiated and given a pcap or other packet capture file to process, gives a user the choice of which type of receive port (e.g., Intel, Broadcom, Mellanox, Qlogic, etc.) that packets in the packet capture file are to be replayed to.

The hardware configuration used by an end-user (e.g., the end-user's environment from which the packet capture file is obtained) may be specified in a hardware configuration file. The hardware configuration file may also be used to specify various details of the back-end test bed to be utilized for packet analysis. Such details may include, but are not limited to, the IP addresses, SSH credentials, transmit/receive host ports (e.g., vmnic information for such host ports), etc.

It is to be appreciated that the particular advantages described above and elsewhere herein are associated with particular illustrative embodiments and need not be present in other embodiments. Also, the particular types of information processing system features and functionality as illustrated in the drawings and described above are exemplary only, and numerous other arrangements may be used in other embodiments.

Illustrative embodiments of processing platforms utilized to implement functionality for automated determination of error-causing network packets utilizing network packet replay will now be described in greater detail with reference to FIGS. 5 and 6. Although described in the context of system 100, these platforms may also be used to implement at least portions of other information processing systems in other embodiments.

Figure 5:
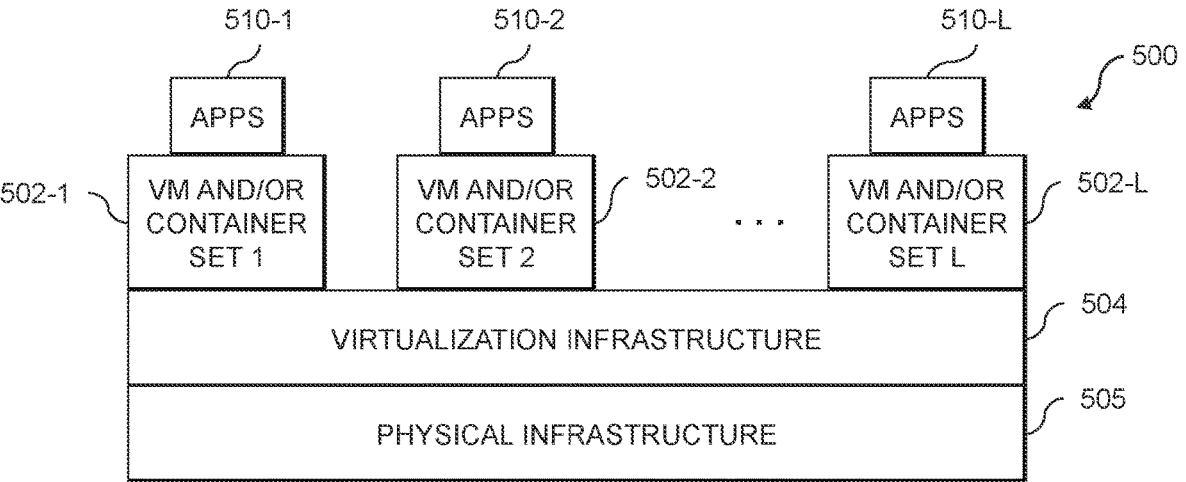
FIGS. 5 and 6 show examples of processing platforms that may be utilized to implement at least a portion of an information processing system in illustrative embodiments.
Figure 6:
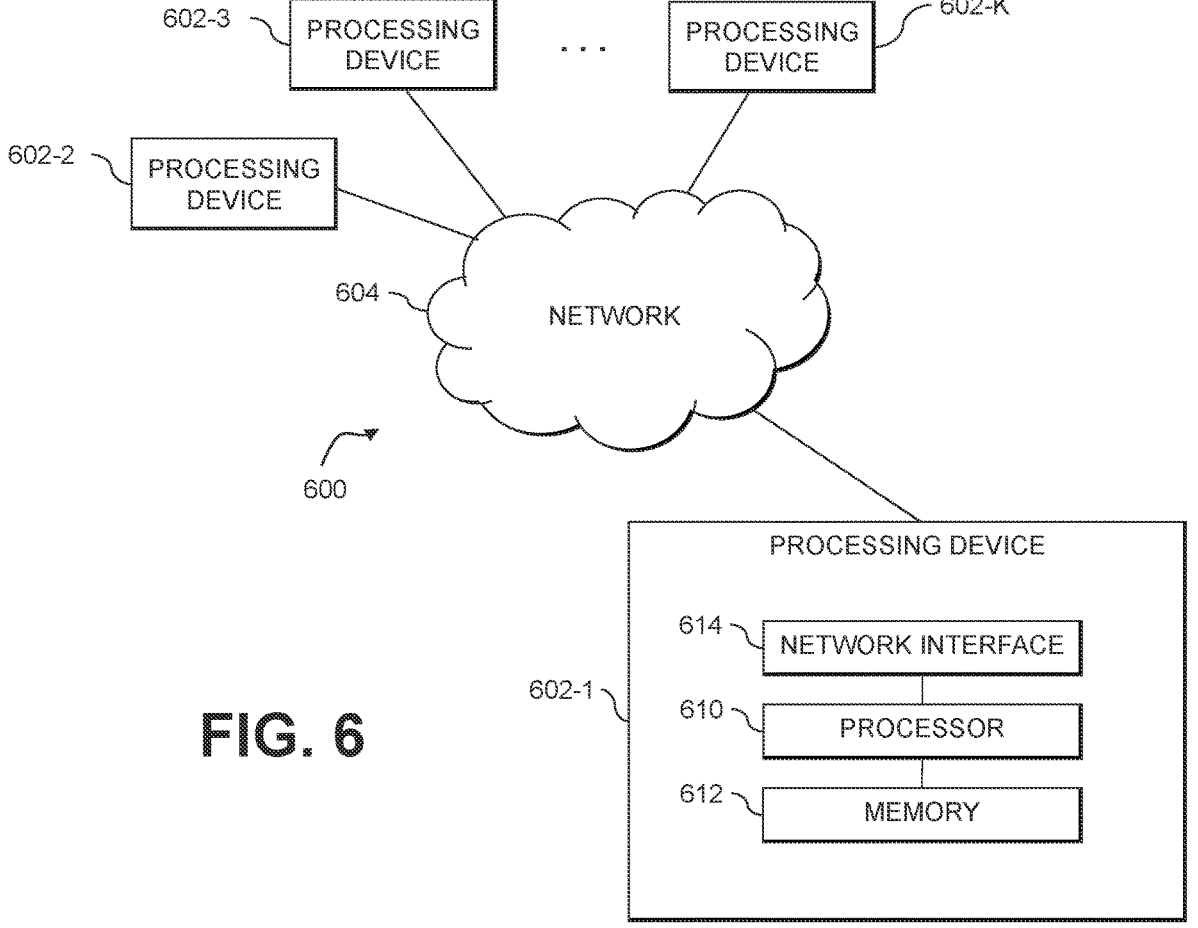

FIG. 5 shows an example processing platform comprising cloud infrastructure 500. The cloud infrastructure 500 comprises a combination of physical and virtual processing resources that may be utilized to implement at least a portion of the information processing system 100 in FIG. 1. The cloud infrastructure 500 comprises multiple virtual machines (VMs) and/or container sets 502-1, 502-2, . . . 502-L implemented using virtualization infrastructure 504. The virtualization infrastructure 504 runs on physical infrastructure 505, and illustratively comprises one or more hypervisors and/or operating system level virtualization infrastructure. The operating system level virtualization infrastructure illustratively comprises kernel control groups of a Linux operating system or other type of operating system.

The cloud infrastructure 500 further comprises sets of applications 510-1, 510-2, . . . 510-L running on respective ones of the VMs/container sets 502-1, 502-2 . . . 502-L under the control of the virtualization infrastructure 504. The VMs/container sets 502 may comprise respective VMs, respective sets of one or more containers, or respective sets of one or more containers running in VMs.

In some implementations of the FIG. 5 embodiment, the VMs/container sets 502 comprise respective VMs implemented using virtualization infrastructure 504 that comprises at least one hypervisor. A hypervisor platform may be used to implement a hypervisor within the virtualization infrastructure 504, where the hypervisor platform has an associated virtual infrastructure management system. The underlying physical machines may comprise one or more distributed processing platforms that include one or more storage systems.

In other implementations of the FIG. 5 embodiment, the VMs/container sets 502 comprise respective containers implemented using virtualization infrastructure 504 that provides operating system level virtualization functionality, such as support for Docker containers running on bare metal hosts, or Docker containers running on VMs. The containers are illustratively implemented using respective kernel control groups of the operating system.

As is apparent from the above, one or more of the processing modules or other components of system 100 may each run on a computer, server, storage device or other processing platform element. A given such element may be viewed as an example of what is more generally referred to herein as a "processing device." The cloud infrastructure 500 shown in FIG. 5 may represent at least a portion of one processing platform. Another example of such a processing platform is processing platform 600 shown in FIG. 6.

The processing platform 600 in this embodiment comprises a portion of system 100 and includes a plurality of processing devices, denoted 602-1, 602-2, 602-3, . . . 602-K, which communicate with one another over a network 604.

The network 604 may comprise any type of network, including by way of example a global computer network such as the Internet, a WAN, a LAN, a satellite network, a telephone or cable network, a cellular network, a wireless network such as a WiFi or WiMAX network, or various portions or combinations of these and other types of networks.

The processing device 602-1 in the processing platform 600 comprises a processor 610 coupled to a memory 612.

The processor 610 may comprise a microprocessor, a microcontroller, an application-specific integrated circuit (ASIC), a field-programmable gate array (FPGA), a central processing unit (CPU), a graphical processing unit (GPU), a tensor processing unit (TPU), a video processing unit (VPU)

or other type of processing circuitry, as well as portions or combinations of such circuitry elements.

The memory 612 may comprise random access memory (RAM), read-only memory (ROM), flash memory or other types of memory, in any combination. The memory 612 and other memories disclosed herein should be viewed as illustrative examples of what are more generally referred to as "processor-readable storage media" storing executable program code of one or more software programs.

Articles of manufacture comprising such processor-readable storage media are considered illustrative embodiments. A given such article of manufacture may comprise, for example, a storage array, a storage disk or an integrated circuit containing RAM, ROM, flash memory or other electronic memory, or any of a wide variety of other types of computer program products. The term "article of manufacture" as used herein should be understood to exclude transitory, propagating signals. Numerous other types of computer program products comprising processor-readable storage media can be used.

Also included in the processing device 602-1 is network interface circuitry 614, which is used to interface the processing device with the network 604 and other system components, and may comprise conventional transceivers.

The other processing devices 602 of the processing platform 600 are assumed to be configured in a manner similar to that shown for processing device 602-1 in the figure.

Again, the particular processing platform 600 shown in the figure is presented by way of example only, and system 100 may include additional or alternative processing platforms, as well as numerous distinct processing platforms in any combination, with each such platform comprising one or more computers, servers, storage devices or other processing devices.

For example, other processing platforms used to implement illustrative embodiments can comprise converged infrastructure.

It should therefore be understood that in other embodiments different arrangements of additional or alternative elements may be used. At least a subset of these elements may be collectively implemented on a common processing platform, or each such element may be implemented on a separate processing platform.

As indicated previously, components of an information processing system as disclosed herein can be implemented at least in part in the form of one or more software programs stored in memory and executed by a processor of a processing device. For example, at least portions of the functionality for automated determination of error-causing network packets utilizing network packet replay as disclosed herein are illustratively implemented in the form of software running on one or more processing devices.

It should again be emphasized that the above-described embodiments are presented for purposes of illustration only. Many variations and other alternative embodiments may be used. For example, the disclosed techniques are applicable to a wide variety of other types of information processing systems, information technology assets, etc. Also, the particular configurations of system and device elements and associated processing operations illustratively shown in the drawings can be varied in other embodiments. Moreover, the various assumptions made above in the course of describing the illustrative embodiments should also be viewed as exemplary rather than as requirements or limitations of the disclosure. Numerous other alternative embodiments within the scope of the appended claims will be readily apparent to those skilled in the art.

What is claimed is:

1. An apparatus comprising:

at least one processing device comprising a processor coupled to a memory;

the at least one processing device being configured:

to obtain a network trace comprising a plurality of network packets, the plurality of network packets having been received at a given network adapter of at least one information technology asset;

to provision a test bed different than the at least one information technology asset for analyzing the obtained network trace, the test bed comprising a transmit host and a receive host, the receive host of the test bed comprising two or more ports associated with two or more different network adapter configurations;

to replay at least a subset of the plurality of network packets in the obtained network trace from the transmit host of the test bed to a given one of the two or more ports of the receive host of the test bed, the given port of the receive host of the test bed being associated with a network adapter of the receive host having a given one of the two or more different network adapter configurations selected based at least in part on a network adapter configuration of the given network adapter of the at least one information technology asset;

to parse port statistics of the given port of the receive host, the port statistics comprising error counters for one or more designated error types; and to determine, based at least in part on the parsed port statistics of the given port of the receive host, whether respective ones of the packets in the subset of the plurality of network packets comprise error-causing packets having at least a threshold likelihood of being sources of one or more alarms raised on the at least one information technology asset.

2. The apparatus of claim 1 wherein the at least one information technology asset comprises hyper-converged infrastructure utilizing storage virtualization software to implement one or more virtual storage networks, and wherein the given network adapter comprises a physical network interface card used for processing storage traffic in the one or more virtual storage networks.

3. The apparatus of claim 2 wherein the one or more alarms raised on the at least one information technology asset comprises alarms raised in the storage virtualization software in response to counters of the one or more designated error types for the given network adapter exceeding respective designated error count thresholds.

4. The apparatus of claim 1 wherein the receive host of the test bed comprises a server with two or more network adapters having the two or more different network adapter configurations, and wherein replaying at least a subset of the plurality of network packets in the obtained network trace from the transmit host of the test bed to the given port of the receive host of the test bed comprises selecting the given port associated with one of the two or more network adapters of the server which matches the given network adapter of the at least one information technology asset.

5. The apparatus of claim 4 wherein the server comprises a physical server and the two or more network adapters comprise two or more physical network interface cards.

6. The apparatus of claim 4 wherein the server comprises a virtual server and the two or more network adapters comprise two or more virtual network interface cards.

7. The apparatus of claim 4 wherein the server runs a bare metal hypervisor with one or more virtual machines configured to run an operating system matching that of the at least one information technology asset.

8. The apparatus of claim 1 wherein the receive host of the test bed comprises a server with a network adapter configured to emulate the two or more different network adapter configurations, and wherein replaying at least a subset of the plurality of network packets in the obtained network trace from the transmit host of the test bed to the given port of the receive host of the test bed comprises configuring the network adapter of the server to emulate the network adapter configuration of the given network adapter of the at least one information technology asset.

9. The apparatus of claim 1 wherein parsing the port statistics of the given port of the receive host comprises comparing first port statistics information of the given port prior to replay of each packet of the subset of the plurality of network packets in the obtained network trace with second port statistics information of the given port subsequent to replay of each packet of the subset of the plurality of network packets in the obtained network trace.

10. The apparatus of claim 1 wherein the one or more designated error types comprise at least one of receive length errors, redundancy check errors, and packet drop errors.

11. The apparatus of claim 1 wherein the network trace comprises a packet capture file with a plurality of frames corresponding to the plurality of network packets, and wherein determining whether respective ones of the packets in the subset of the plurality of network packets comprise error-causing packets comprises:

identifying frame identifiers for a subset of the plurality of frames corresponding to the error-causing packets; and generating a filter data structure for filtering the packet capture file to generate another packet capture file including only the subset of the plurality of frames corresponding to the error-causing packets.

12. The apparatus of claim 1 wherein the at least one processing device is further configured to determine whether a given one of the error-causing packets is benign based at least in part on inspecting contents of the given error-causing packet.

13. The apparatus of claim 1 wherein the at least one processing device is further configured to determine whether a given one of the error-causing packets is benign based at least in part on which of the error counters the given error-causing packet increments.

14. The apparatus of claim 1 wherein the at least one processing device is further configured, responsive to determining that a given one of the error-causing packets is not benign, to modify handling of the given error-causing packet by the at least one information technology asset.

15. A computer program product comprising a non-transitory processor-readable storage medium having stored therein program code of one or more software programs, wherein the program code when executed by at least one processing device causes the at least one processing device:

to obtain a network trace comprising a plurality of network packets, the plurality of network packets having been received at a given network adapter of at least one information technology asset;

to provision a test bed different than the at least one information technology asset for analyzing the obtained network trace, the test bed comprising a transmit host and a receive host, the receive host of the test bed comprising two or more ports associated with two or more different network adapter configurations;

to replay at least a subset of the plurality of network packets in the obtained network trace from the transmit host of the test bed to a given one of the two or more ports of the receive host of the test bed, the given port of the receive host of the test bed being associated with a network adapter of the receive host having a given one of the two or more different network adapter configurations selected based at least in part on a network adapter configuration of the given network adapter of the at least one information technology asset;

to parse port statistics of the given port of the receive host, the port statistics comprising error counters for one or more designated error types; and to determine, based at least in part on the parsed port statistics of the given port of the receive host, whether respective ones of the packets in the subset of the plurality of network packets comprise error-causing packets having at least a threshold likelihood of being sources of one or more alarms raised on the at least one information technology asset.

16. The computer program product of claim 15 wherein the at least one information technology asset comprises hyper-converged infrastructure utilizing storage virtualization software to implement one or more virtual storage networks, and wherein the given network adapter comprises a physical network interface card used for processing storage traffic in the one or more virtual storage networks.

17. The computer program product of claim 16 wherein the one or more alarms raised on the at least one information technology asset comprises alarms raised in the storage virtualization software in response to counters of the one or more designated error types for the given network adapter exceeding respective designated error count thresholds.

18. A method comprising:

obtaining a network trace comprising a plurality of network packets, the plurality of network packets having been received at a given network adapter of at least one information technology asset;

provisioning a test bed different than the at least one information technology asset for analyzing the obtained network trace, the test bed comprising a transmit host and a receive host, the receive host of the test bed comprising two or more ports associated with two or more different network adapter configurations;

replaying at least a subset of the plurality of network packets in the obtained network trace from the transmit host of the test bed to a given one of the two or more ports of the receive host of the test bed, the given port of the receive host of the test bed being associated with a network adapter of the receive host having a given one of the two or more different network adapter configurations selected based at least in part on a network adapter configuration of the given network adapter of the at least one information technology asset;

parsing port statistics of the given port of the receive host, the port statistics comprising error counters for one or more designated error types; and determining, based at least in part on the parsed port statistics of the given port of the receive host, whether respective ones of the packets in the subset of the plurality of network packets comprise error-causing packets having at least a threshold likelihood of being sources of one or more alarms raised on the at least one information technology asset;

wherein the method is performed by at least one processing device comprising a processor coupled to a memory.

19. The method of claim 18 wherein the at least one information technology asset comprises hyper-converged infrastructure utilizing storage virtualization software to implement one or more virtual storage networks, and wherein the given network adapter comprises a physical network interface card used for processing storage traffic in the one or more virtual storage networks.

20. The method of claim 19 wherein the one or more alarms raised on the at least one information technology asset comprises alarms raised in the storage virtualization software in response to counters of the one or more designated error types for the given network adapter exceeding respective designated error count thresholds.

* * * * *